US010057331B2

(12) United States Patent
Austel et al.

(10) Patent No.: US 10,057,331 B2
(45) Date of Patent: Aug. 21, 2018

(54) AUTOMATIC ABSTRACTION OF FLOW OF CONTROL IN A DISTRIBUTED VIRTUALIZATION PLATFORM

(71) Applicant: International Business Machines Corporation, Armonk, NY (US)

(72) Inventors: Paula K. Austel, Cortlandt Manor, NY (US); Nima Kaviani, Vancouver (CA); Eugene M. Maximilien, San Jose, CA (US); Isabelle M. Rouvellou, New York, NY (US); Ignacio Silva-Lepe, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 14/567,182

(22) Filed: Dec. 11, 2014

(65) Prior Publication Data
US 2016/0173646 A1    Jun. 16, 2016

(51) Int. Cl.
*H04L 29/08*    (2006.01)
*G06F 9/455*    (2018.01)

(52) U.S. Cl.
CPC .......... *H04L 67/10* (2013.01); *G06F 9/45558* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 5,901,058 A | 5/1999 | Steinman et al. |
| 6,182,095 B1 | 1/2001 | Leymaster et al. |
| 6,981,207 B1 | 12/2005 | Bakman et al. |
| 7,620,885 B2 | 11/2009 | Moulckers et al. |

(Continued)

FOREIGN PATENT DOCUMENTS

CN    103279421 A    9/2013

OTHER PUBLICATIONS

Eberbach et al., "Computing Models for Distributed Autonomic Clouds and Grids in the Context of the DIME Network Architecture", 2012 IEEE 21st International WETICE, DOI 10.1109/WETICE.2012.10, pp. 125-130.

(Continued)

*Primary Examiner* — Angela Nguyen
(74) *Attorney, Agent, or Firm* — David B. Woycechowsky

(57) ABSTRACT

A distributed component software system that includes an analysis server that: (i) receives a set of messages, where each message is sent between components of a distributed component software system (DCSS), and where each message includes an identification of a respective source component, an identification of a respective target component and respective message content; (ii) for each message of the set of received messages, resolves the respective source component; (iii) for each message of the set of received messages, resolves the respective source component; (iv) determines a sequence of the plurality of messages; and (v) generates a human-understandable abstract corresponding to the set of received messages based upon the respective message sources, the respective message targets, the respective message content and the sequence of the set of received messages.

18 Claims, 12 Drawing Sheets

(56) References Cited

U.S. PATENT DOCUMENTS

| | | |
|---|---|---|
| 8,219,923 B2 | 7/2012 | Peck et al. |
| 2002/0162025 A1* | 10/2002 | Sutton .................. H04L 63/145 726/4 |
| 2004/0122831 A1 | 6/2004 | Ha et al. |
| 2004/0122912 A1 | 6/2004 | Kim et al. |
| 2005/0015668 A1* | 1/2005 | Doyle .................. G06F 11/079 714/25 |
| 2007/0214206 A1* | 9/2007 | Malloy .................. H04L 41/22 709/200 |
| 2011/0246528 A1 | 10/2011 | Hsieh et al. |
| 2011/0289301 A1 | 11/2011 | Allen et al. |
| 2012/0095973 A1 | 4/2012 | Kehoe et al. |

OTHER PUBLICATIONS

Garousi, Vahid, "A Genetic Algorithm-based Stress Test Requirements Generator Tool and its Empirical Evaluation", IEEE Transactions on Software Engineering, vol. 36, No. 6, Nov./Dec. 2010, pp. 778-797.

Greenyer et al., "The Mechatronic UML Development Process" Engineering of Software, Springer, 2011, pp. 311-322, DOI 10.1007/978-3-642-19823-6_16.

Tan et al., "Mochi: Visual Log-Analysis Based Tools for Debugging Hadoop", Proc. of the 2009 Conference on Hot Topics in Cloud Computing, USENIX Association, 2009, pp. 1-5.

* cited by examiner

AUTOMATIC ABSTRACTION OF FLOW OF CONTROL IN A DISTRIBUTED VIRTUALIZATION PLATFORM

BACKGROUND OF THE INVENTION

The present invention relates generally to the field of distributed component software systems (DCSSs), and more particularly to the field of distributed virtualization platforms (DVPs).

DCSSs are known. On example of a type of DCSS is a DVP. Some DVPs provide cloud computing platform as a service (PaaS). One example of software used on a DVP to provide PaaS is Cloud Foundry. (Note: the term(s) "Cloud Foundry" may be subject to trademark rights in various jurisdictions throughout the world and are used here only in reference to the products or services properly denominated by the marks to the extent that such trademark rights may exist.)

Continuing with Cloud Foundry as an example, one part of a typical Cloud Foundry system is VMC (VMware Cloud) console interface. Using this tool, a user can deploy and manage applications running on most Cloud Foundry based environments including CloudFoundry.com. Commands in VMC are broken up in to managing various concerns on Cloud Foundry; applications, services, organizations, spaces, domains etc. A user can issue a command by running "VMC" in the console immediately followed by a command name.

Another part of a typical Cloud Foundry system is the Cloud Controller. The Cloud Controller provides REST (representational state transfer) API (application program interface) endpoints for clients to access the system. The Cloud Controller maintains a database with tables for orgs, spaces, apps, services, service instances, user roles, and more. The Cloud Controller manages a blob store for: (i) resources—files that are uploaded to the Cloud Controller with a unique SHA such that they can be reused without re-uploading the file; (ii) app packages—unstaged files that represent an application; and (iii) droplets—the result of taking an app package and staging it (processing a buildpack) and preparing it to run. The Cloud Controller interacts with other core components of the Cloud Foundry platform using the NATS message bus. For example, it performs the following using NATS: (i) instructs a DEA to stage an application (processes a buildpack for the app) to prepare it to run; (ii) instructs a DEA to start or stop an application; (iii) receives information from the Health Manager about applications; (iv) subscribes to Service Gateways that advertise available services; and (v) instructs Service Gateways to handle provisioning, unprovision, bind and unbind operations for services.

NATS is an open-source, lightweight cloud messaging system. NATS has an always-on dial tone that facilitates a high degree of availability. NATS can be used as a messaging system in building reliable, and scalable, cloud and distributed systems.

The key functions of a Droplet Execution Agent (DEA) are: (i) manage warden containers—the DEA stages applications and runs applications in Warden containers; (ii) stage applications—when a new application or a new version of an application is pushed to Cloud Foundry, the Cloud Controller selects a DEA from the pool of available DEAs to stage the application (the DEA uses the appropriate buildpack to stage the application, and the result of this process is a droplet; (iii) run droplets—a DEA manages the lifecycle of each application instance running in it, starting and stopping droplets upon request of the Cloud Controller (the DEA monitors the state of a started application instance, and periodically broadcasts application state messages over NATS for consumption. When the DEA receives requests for directories and files, it redirects them to the Directory Server URL. The URL is signed by the DEA, and the Directory Server checks the validity of the URL with the DEA before serving it. A DEA periodically checks the health of the applications running in it. If a URL is mapped to an application, the DEA attempts to connect to the port assigned to the application. If the application port is accepting connections, the DEA considers that application state to be "Running." If there is no URL mapped to the application, the DEA checks the system process table for the application process identification number. If the application process identification number exists, the DEA considers that application state to be "Running." The DEA also checks for a AppState object for the application.

Within a DVP context, there is a known concept called "flow of control." Flow of control refers to which software component, or components, are in control of a given process at each given point in time while the process is occurring. For example, a flow of control for deletion of an "app" on a Cloud Foundry DVP typically is as follows: (i) VMC component begins communicating with Cloud Controller component to delete the app; (ii) Cloud Controller component communicates with the DEA component to stop the droplet associated with the app; (iii) DEA component: (a) communicates with a router component to unregister the app, and (b) communicates with the health manager component to notify regarding droplet exit.

SUMMARY

According to an aspect of the present invention, there is a method, computer program product and/or system that performs the following operations (not necessarily in the following order): (i) receiving, by an analysis server, a plurality of messages, where each message of the plurality of messages is sent between components of a distributed component software system (DCSS), and where each message includes an identification of a respective source component, an identification of a respective target component and respective message content; (ii) for each message of the plurality of messages, resolving, by the analysis server, the respective source component; (iii) determining, by the analysis server, a sequence of the plurality of messages; and (iv) generating, by the analysis server, a human-understandable abstract corresponding to the plurality of messages based upon the respective message sources, the respective message targets, the respective message content and the sequence of the plurality of messages.

DETAILED DESCRIPTION

Figure 1:
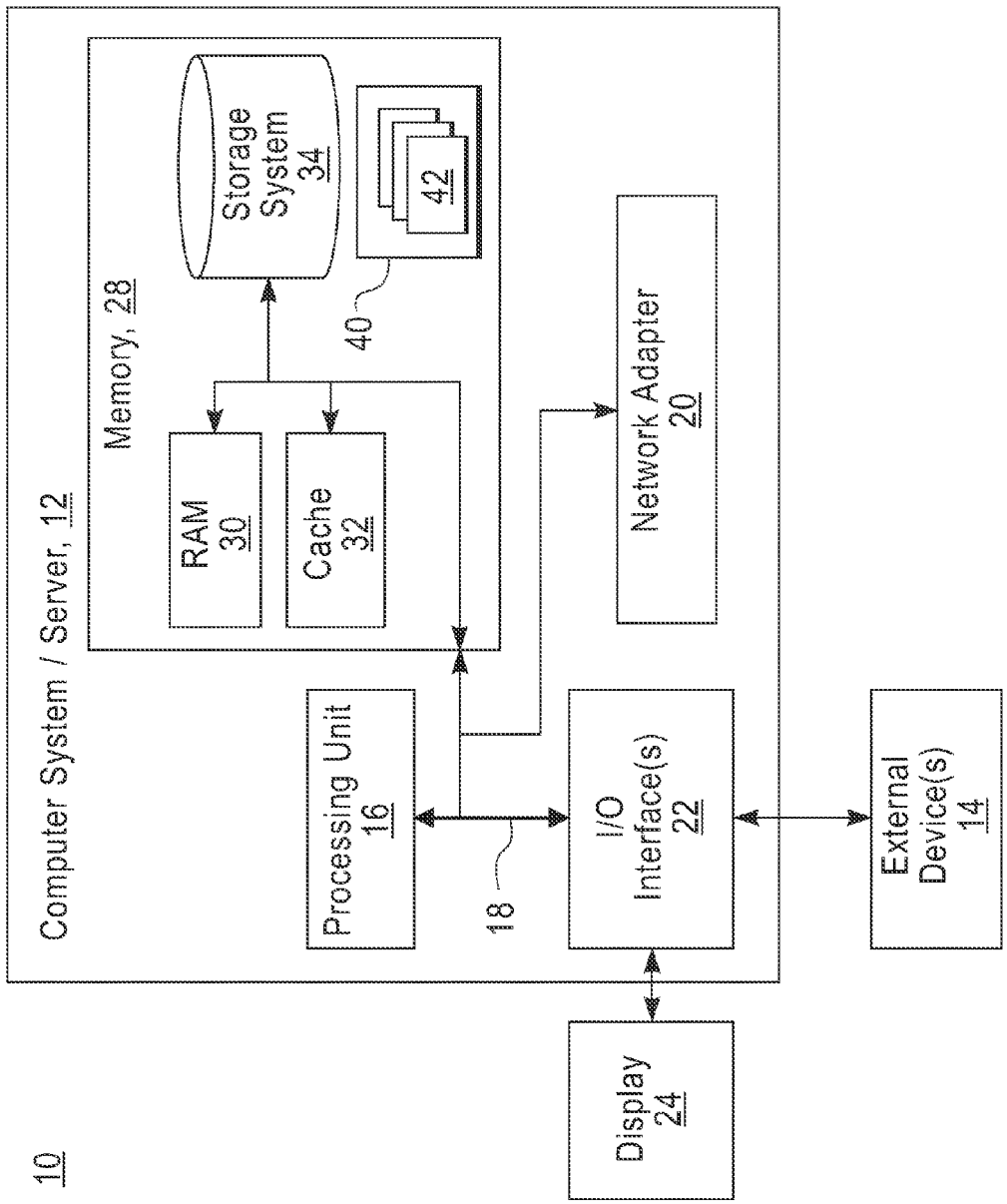
FIG. 1 depicts a cloud computing node used in a first embodiment of a system according to the present invention.

A distributed component software system (DCSS) that includes an analysis server receives a set of messages communicated between source and target components of the DCSS. The analysis server generates a human-understandable abstract corresponding to the set of received messages based upon the respective message sources, the respective message targets, the respective message content and the sequence of the set of received messages. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
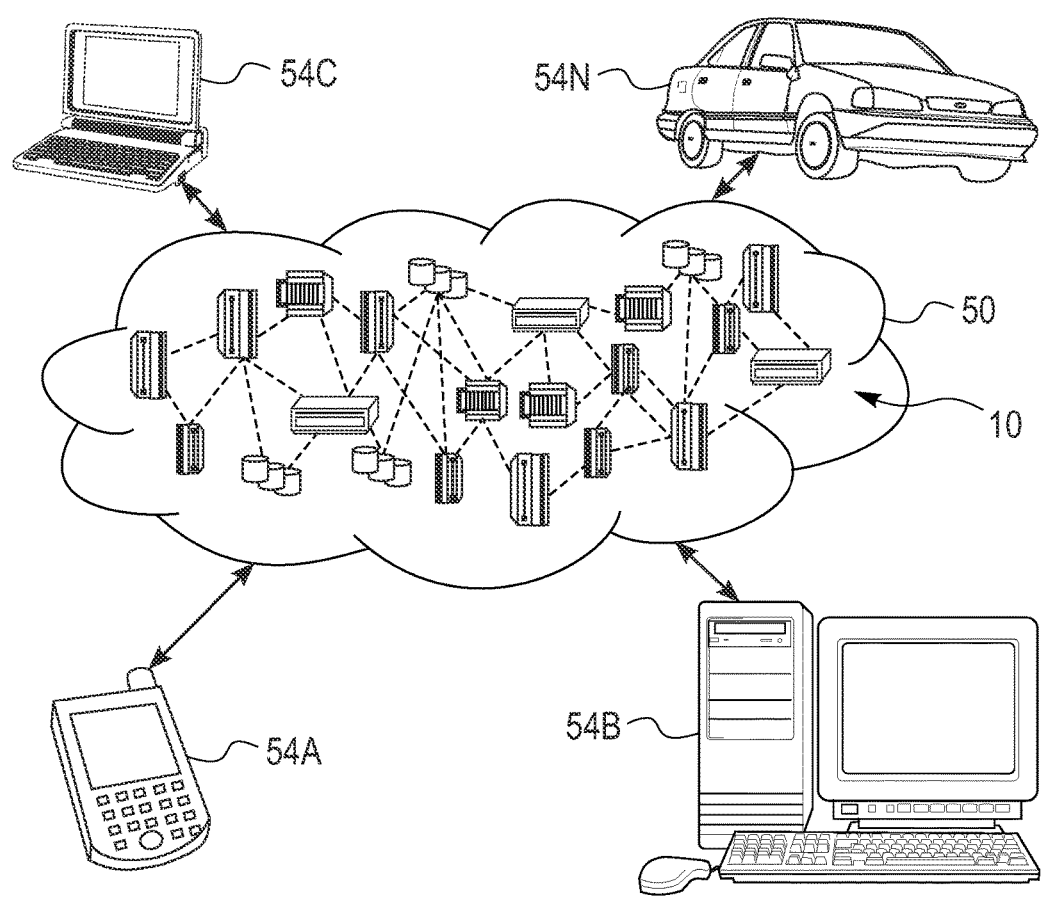
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
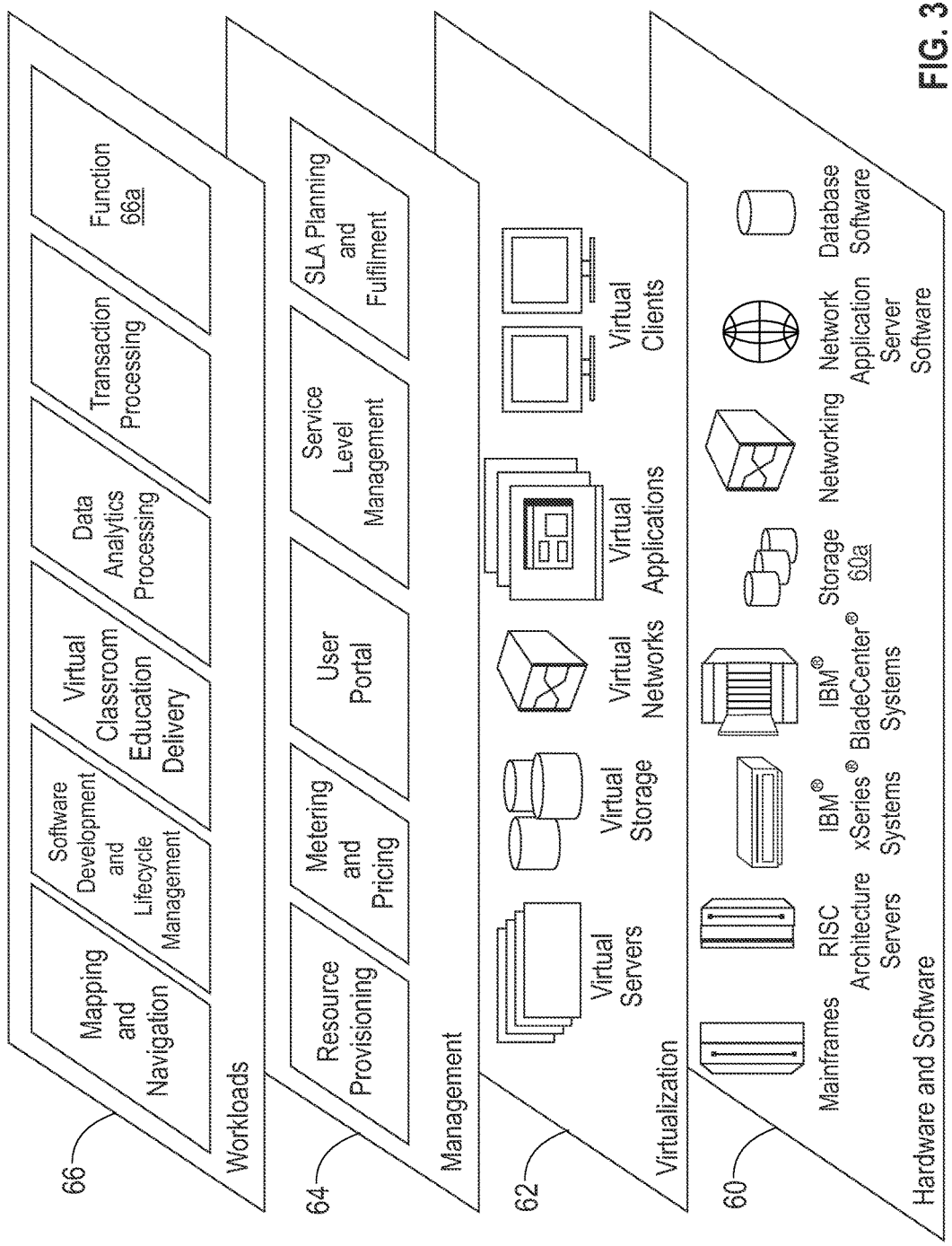
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 4:
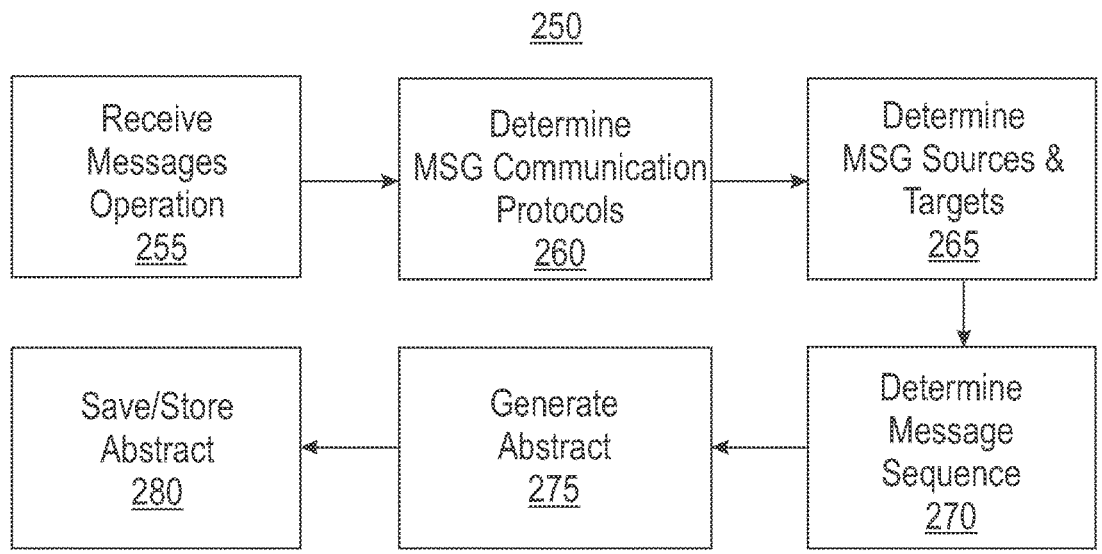
FIG. 4 is a flowchart showing a first embodiment method performed, at least in part, by the first embodiment system.
Figure 5:
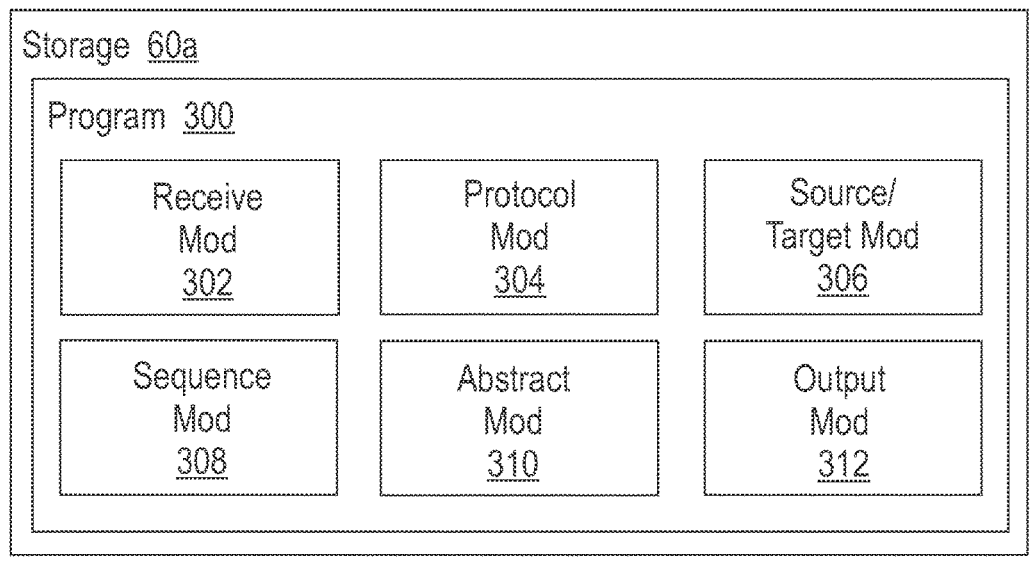
FIG. 5 is a block diagram of a machine logic (for example, software) portion of the first embodiment system.

FIG. 4 shows flowchart 250 depicting a method according to the present invention. FIG. 5 shows program 300 for performing at least some of the operations of flow chart 250. This method and associated software will now be discussed, over the course of the following paragraphs, with extensive reference to FIG. 4 (for the flow chart blocks) and FIG. 5 (for the software blocks). As shown in FIG. 5, one physical location where program 300 may be stored is in storage block 60a. Program 300 controls operations of an "analysis server." In this example the hardware for the analysis server is shown in FIG. 1 at reference numeral 10.

Processing begins at operation 255, receive module ("mod") 302 receives a set of received messages, which have been communicated during operations of a distributed component software system (not separately numbered in FIGS. 1 to 3). A detailed example of a DCSS will be discussed in detail, below, in the Further Comments And/Or Embodiments of this Detailed Description section.

In this example, the set of received messages, received by receive mod 302, is not filtered. Alternatively, and as will be discussed in greater detail below, some embodiments may filter the set of received messages such that only a sub-set of the received messages are processed during subsequent operations of flow chart 250. Each message of the set of received messages has a communication protocol that controls how the message itself is transferred, and this communication protocol is determined by the inserted code snippet that causes the message to be sent by the distributed code snippet into which the distributed code snippet is inserted. In this example, each received message may be encoded into one of three possible message communication protocols: communication protocol A, communication protocol B or communication protocol C. Each received message includes: (i) the identity of its source component (that is, the component of the DCSS that sent the message); (ii) the identity of its target component (that is, the component of the DCSS that received the message); and (iii) message content.

Processing proceeds to operation 260, where protocol mod 304 determines the respective message communication protocol for each received message so that the message can be resolved.

Processing proceeds to operation 265, where source/target mod 306 resolves the source component and the target component respectively corresponding to each of the received messages.

Figure 12:
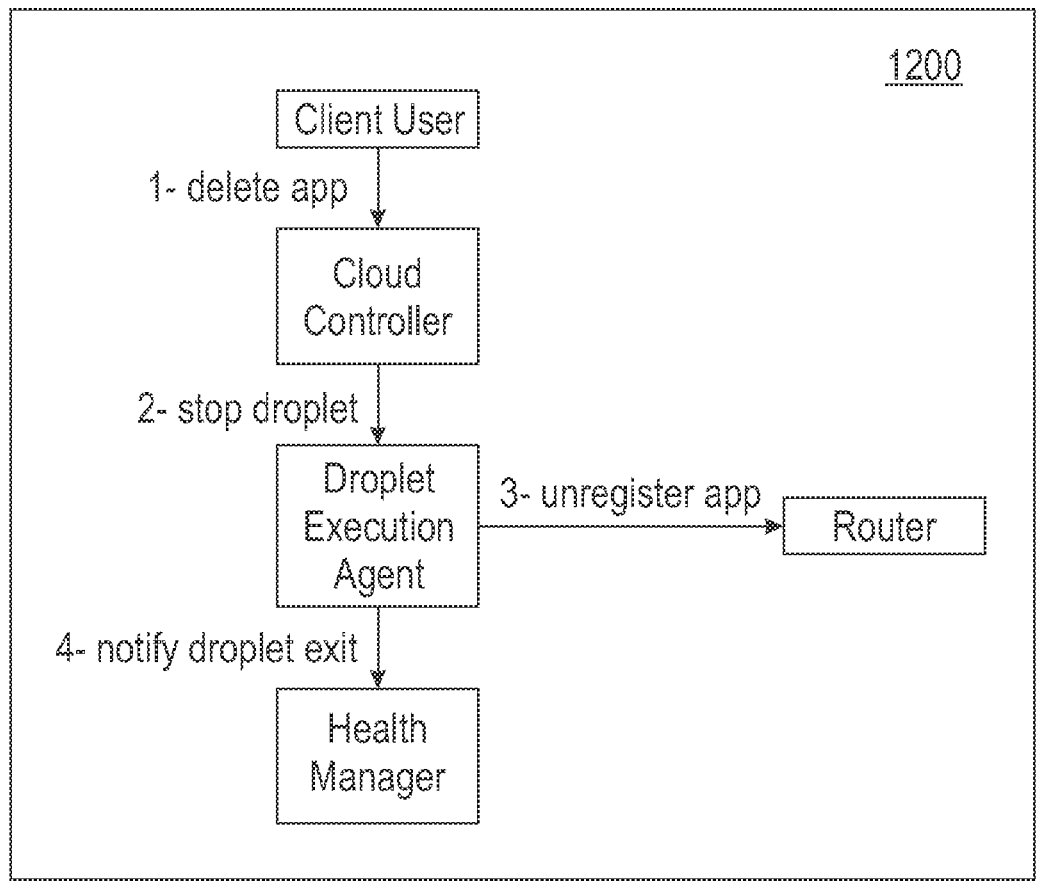
FIG. 12 is a screenshot view showing another abstract of control flow presentation.

Processing proceeds to operation 270, where sequence mod 308 determines the time sequence of the messages of the set of received messages. It is noted that the messages may be received out of time order at the analysis server, to sequence, mod 308 determines the correct sequence. More specifically, in this example, the aspect-oriented programming (AOP) engine generates time stamps for each message that is sent and received. Determining the message sequence is given by the order of these time stamps. Processing proceeds to operation 275, where abstract mod 310 generates (or "synthesizes") a human-understandable abstract corresponding to the set of received messages based upon the respective message sources, the respective message targets, the respective message content and the sequence of the set of received messages. Examples of abstracts will be discussed, below, in connection with FIGS. 10 and 12.

As mentioned above, in some embodiments of the present invention, message content is used to help build the abstract and/or control of flow presentation. One way that raw message content can be used to help build a flow of control is that the analysis server may include machine logic (for example, "intelligence," rules) for interpreting the raw message content so that the message can be appropriately located and helpfully annotated within the control of flow presentation. Alternatively, or additionally, this interpretational machine logic can be located in the distributed components. As will be seen in the following sub-section of this document, this machine logic, distributed over the components of the DCSS, may take the form of "injected code snippets." An example of this distributed machine will be given in the following paragraph.

Assume a DCSS where component A sends data to component B in two different situations: (i) for verification purposes (situation #1); or (ii) for data compression purposes (situation #2). Component B is structured and/or programmed so that, when it receives raw data from component A, component B will have sufficient information to determine whether the data is to be verified (situation #1) or compressed (situation #2). However, this information cannot be determined simply by analyzing the raw data (that is, the raw message content). Accordingly, in some embodiments of the present invention, a code snippet in component A will send the message to the analysis server, along with information specifying whether the data is being sent for verification purposes (situation #1) or compression purposes (situation #2). This information is then used, by the analysis server, in creating the control of flow presentation and/or abstract. In these embodiments, intelligence for creating the control of flow presentation is distributed, which can be helpful for purposes of coding and communications-related efficiency and effectiveness.

Processing proceeds to operation 280, where output mod 312: (i) presents the abstract to a human user (for example, on display 24 shown in FIG. 1); and (ii) saves the output as computer readable files for later use by humans and/or computers.

III. FURTHER COMMENTS AND/OR EMBODIMENTS

Some embodiments of the present invention recognize the following facts, potential problems and/or potential areas for improvement with respect to the current state of the art: (i) there could be a better understanding, by developers, of the operation of DVPs; (ii) there could be a better understanding, by developers, of the behavior of a DVPs which implement Platform as a Service (PaaS); (iii) there is room for improvement in understanding distributed cloud platforms (such as distributed open source cloud platforms, like Cloud Foundry); (iv) there is room for improvement in the tracking of cloud software as the software progresses from one version (or release, etc.) to the next; (v) there is room for improvement in the tracking of cloud software as the software progresses from online editions to enterprise editions; and/or (vi) there is room for improvement with respect to software resiliency and testing of cloud software.

Some embodiments of the present invention may include one, or more, of the following features, characteristics and/or advantages: (i) "abstracting" the flow of control of a system of distributed software components by synthesizing the flow of control from the execution of code snippets injected into the components; (ii) analyze the exchanged messages between components of a DVP; (iii) inspect message contents of messages communicated within a DVP; and/or (iv) extract data and control flow (also referred to as "flow of control") across components of a DVP.

Some embodiments of the present invention may include one, or more, of the following features, characteristics and/or advantages: (i) detect security; (ii) detect performance vulnerabilities; (iii) provide a fine-grained level of profiling statistics; (iv) graph of cross-component messages; and/or (v) provide message schema documentation.

One aspect of the present invention is directed to a method for automatic abstraction of flow of control in a DVP system including the following operations (not necessarily in the following order): (i) obtaining a code snippet from user, where the code snippet includes code to communicate with a distinguished server component; (ii) injecting the code snippet into the software components; (iii) executing a "use case" on the software components in a distributed manner exercising the injected code snippets thereby allowing the code snippets to communicate component state to said server component; and (iv) synthesizing, by the server component, a flow of control from the state collected from the use case execution of the code snippets. This method may include one, or more, of the following additional operations and/or refinements to the foregoing operations: (v) synthesizing the flow of control synthesized by said server component to further synthesize system documentation; (vi) the synthesized documentation can be converted to standard graphical diagrams isomorphic to the content of the generated documents; (vii) synthesized documentation of different versions of the code snippets can be compared to show the difference in flow of control; (viii) synthesized documentation can include hyperlinks describing details of the messages exchanged; (ix) the flow of control synthesized by said server component is used to inject faults into the system for testing purposes; and/or (x) the generated control flow is cross-checked with security compliance audit trails to determine whether the system in question passed the audit.

Figure 6:
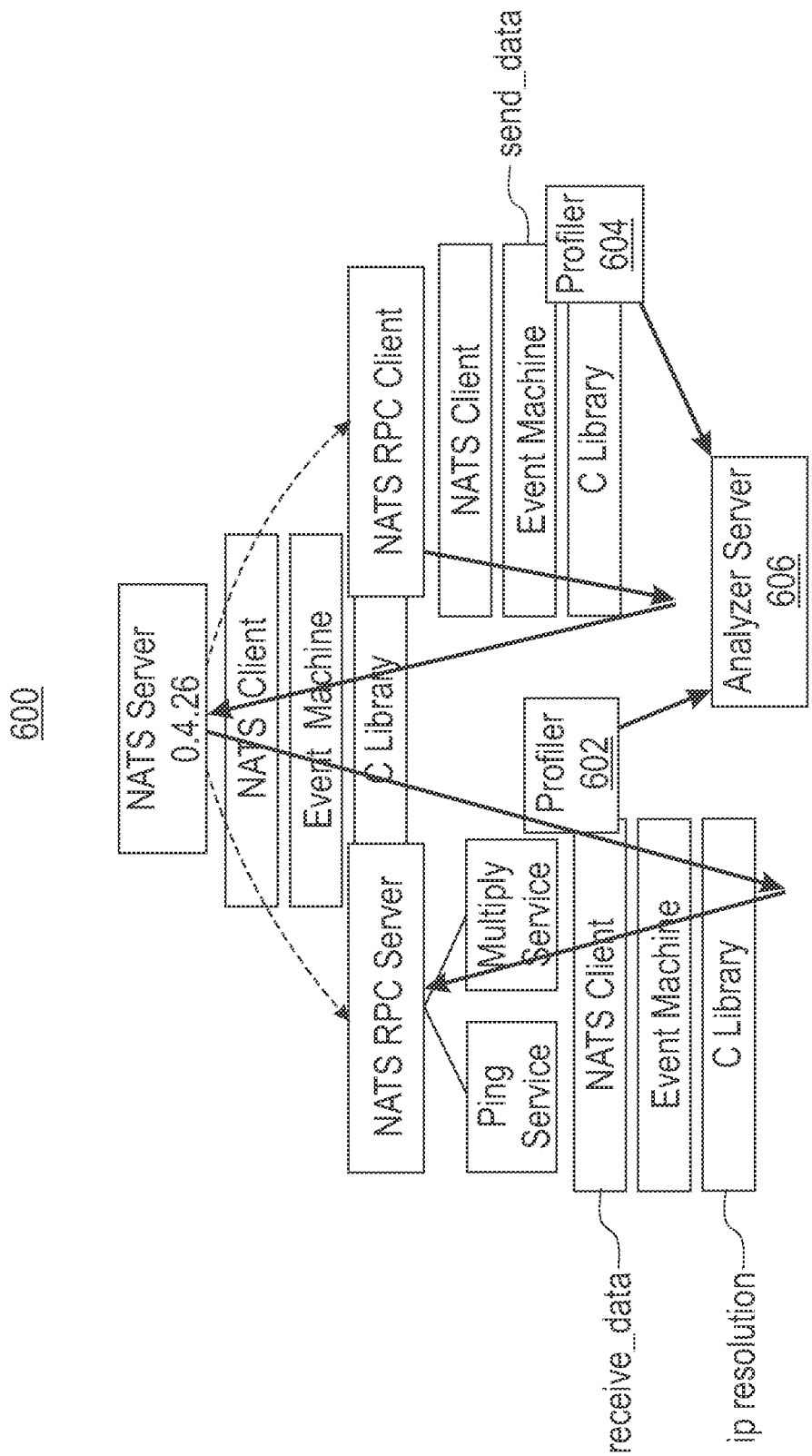
FIG. 6 is a block diagram of a second embodiment of a system according to the present invention.

As shown in FIG. 6, system 600 represents a prototype design of a DVP that provides abstraction of flow control. More specifically, profiler blocks 602, 604 and analyzer server 606 are helpful in providing abstraction of flow of control and/or other related functions.

Some embodiments of the present invention may include one, or more, of the following features, characteristics and/or advantages: (i) understanding type, value, and sequence of exchanged messages; (ii) altering message content for failure testing and software resiliency; (iii) analyzing message exchange performance, bottlenecks; (iv) graph of cross-component messages; (v) message schema documentation; (vi) abstracting approach to introspect protocol into DSL (domain specific language); (vii) providing a formal definition for the message protocol introspection.

Figure 7:
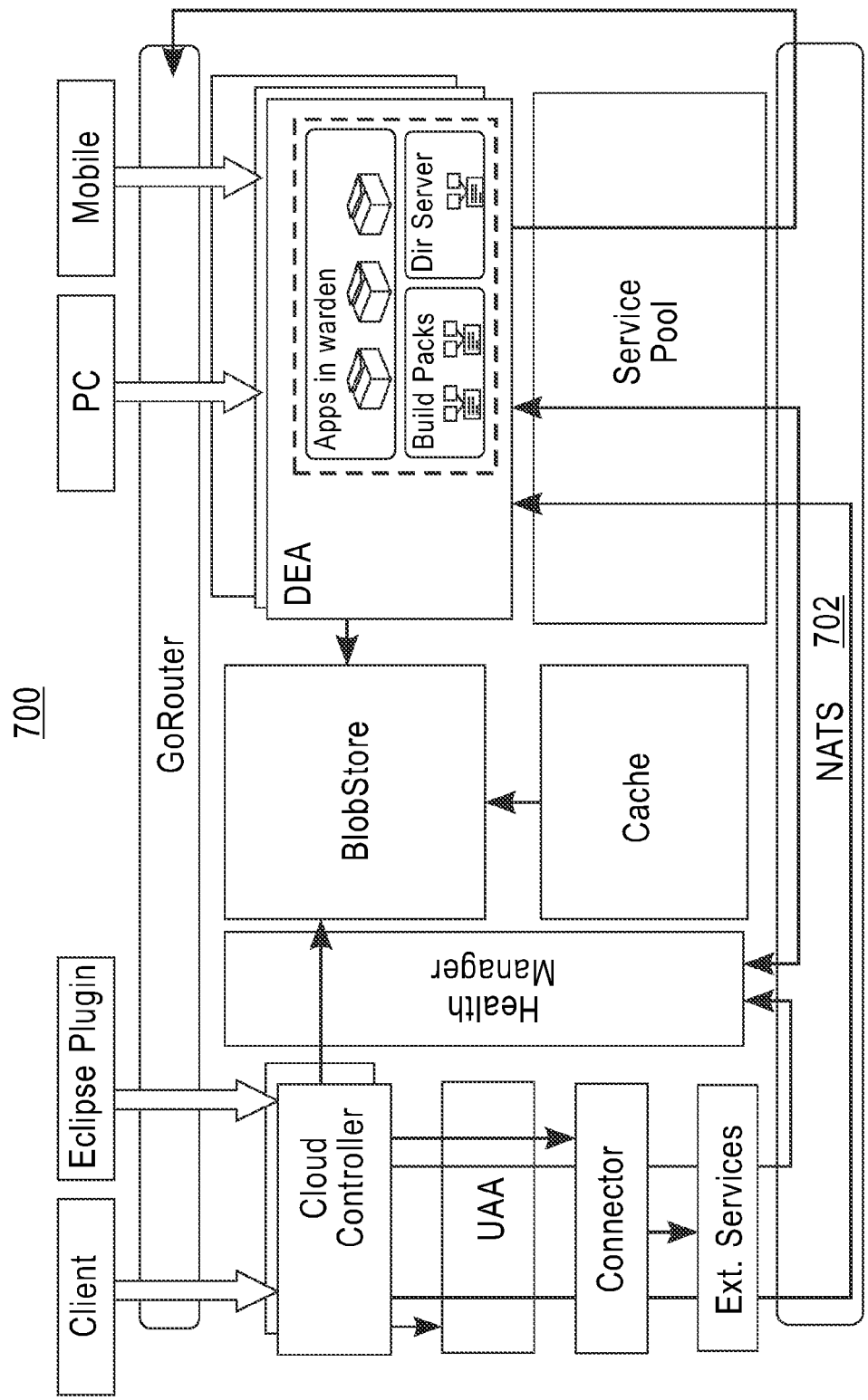
FIG. 7 is a block diagram of a third embodiment of a system according to the present invention.

FIG. 7 shows Cloud Foundry DVP 700 which is a representative DVP to which various embodiments of the present invention may be applied. System 700 itself is conventional and commercially available so that the various blocks of FIG. 7 do not need to be discussed in detail here. It will be mentioned that: (i) communication paths are shown by arrows in system 700; (ii) these communication paths carry the communications that effectively define the flow of control (as will be discussed in more detail, below); (iii) communication paths passing through NATS block 702 carry communications made in NATS form and format; and (iv) other communications are non-NATS (for example, HTTP (hypertext transfer protocol)).

As used herein, the term "code introspection" refers to capturing message exchanges in a DVP system. An example of code introspection will now be discussed with reference to "Aquarium" (Aspect-oriented programming for Ruby). In this example, join points lead to point cuts which lead to advice. This example will be explained in terms of code segments. The first code segment is as follows:

```
class Test
    def test_method
        puts "Hello World!"
    end
end
```

Machine logic according to an embodiment of the present invention recognizes "test_method" from the above code segment as a join point.

Processing proceeds to the following second code segment:

```
Aspect.new     :around, :calls_to => "test_method",
               :type_and_descendents => "Test",
               :method_options[:public] do |jpt, obj, *args|
    puts "Pre-Aspect Execution."
    result = jpt.proceed
    puts "Post-Aspect Execution."
end
```

Machine logic according to an embodiment of the present invention determines that the following portions of the second code segment are point cuts: (i) test_method; and (ii) Test. Machine logic according to an embodiment of the present invention determines that the following portions of the second code segment are advice: (i) puts "Pre-Aspect Execution."; (ii) result=jpt.proceed; and (iii) puts "Post-Aspect Execution."

The third code segment is as follows:

```
class Test
    def test_method
        puts "Hello World!"
    end
    alias_method :_aspect_saved_Test_test_method, :test_method
    def test_method *args, &block_for_method
        # advice chaining
        # advice invocation
    end
    public :test_method
    private :_aspect_saved_Test_test_method
end
```

The third code segment represents an injection of the aspect pattern represented by the second code segment into the test_method of class Test given by the first code segment. The particular embodiment that includes the examples above uses Aspect-Oriented Programming (AOP) to implement code introspection. In AOP, aspect patterns are given, such as the one in code segment two, that are then injected into the code that is being introspected.

The purpose of the third code segment was to show how the original code in the first code segment is converted to the fourth code segment (see below) using the second code segment. Machine logic according to the present invention rewrites the third code segment as a fourth code segment as follows:

```
class Test
    def _aspect_saved_Test_test_method
        puts "Hello World!"
    end
    def test_method *args, &block_for_method
        # advice chaining
        # advice invocation
        # making a call to :_aspect_saved_Test_test_method
    end
```

```
    public :test_method
    private :_aspect_saved_Test_test_method
end
```

Discussion will now shift from code introspection to "code inspection." The AOP, used in the example under discussion, requires some care on the part of the system designer because it is dependent on specific methods and their names in the code to perform injection to enable introspection. If the target method changes, or methods with different names want to be targeted, the aspect patterns need to be revised. The code inspection will be explained in terms of further code segments, building on the first to fourth code segments discussed, above, in connection with code introspection. The fifth code segment is as follows:

```
Aspect.new :around, :calls_to => "test_method",
           :type_and_descendents => "Test",
           :method_options [:public] do |jpt, obj, *args|
    puts "Pre-Aspect Execution."
    result = jpt.proceed
    puts "Post-Aspect Execution."
end
```

Machine language according to the present invention recognizes the following portions of the fifth code segment as being signature dependent: (i) test_method; and (ii) Test. This is an example of code inspection and AOP drawback according to the present invention.

Figure 8:
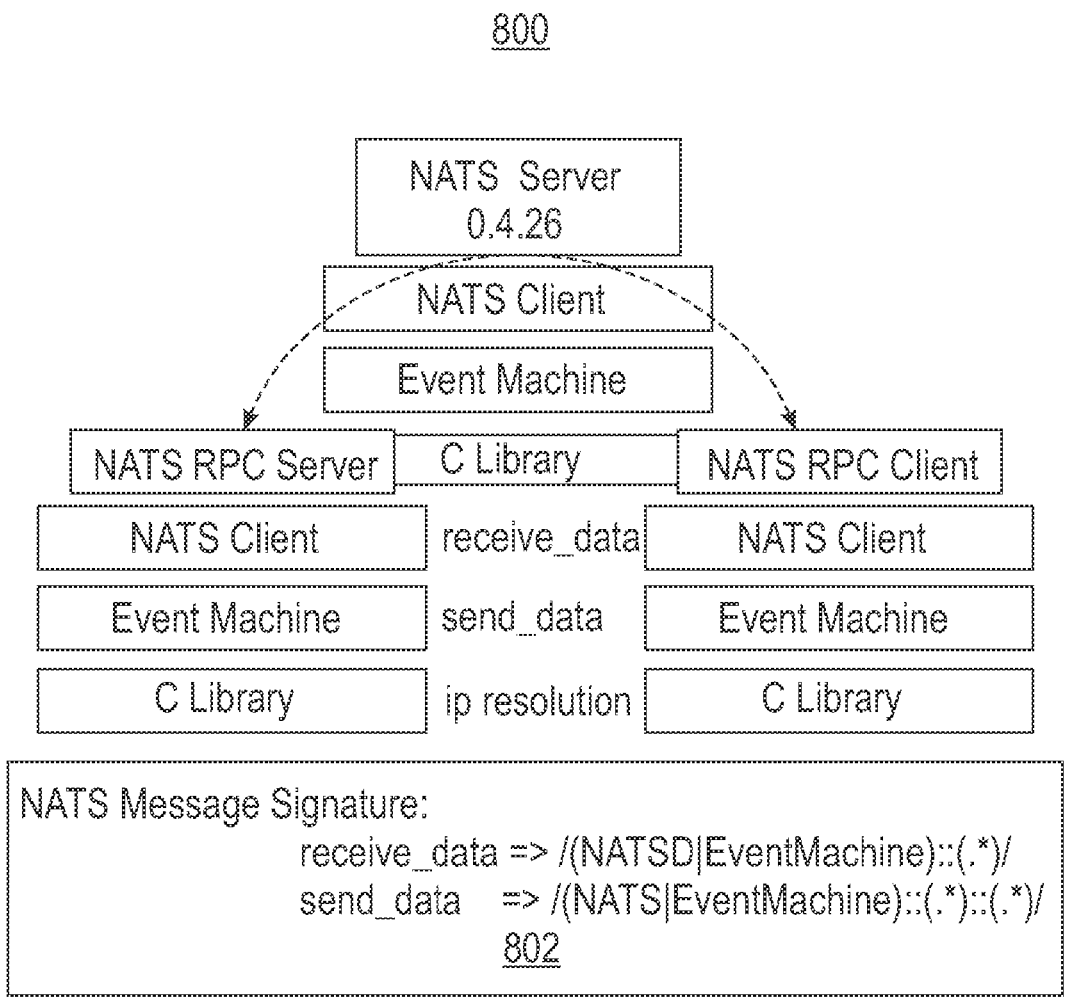
FIG. 8 is a block diagram of a fourth embodiment of a system according to the present invention.

Capturing a NATS communication according to an embodiment of the present invention is shown diagrammatically in diagram 800 of FIG. 8. More specifically, when a NATS communication is sent in the Cloud Foundry DVP system 700 (see FIG. 7, especially communication paths passing through NATS communication block 702), machine logic according to the present invention recognizes this as a signature of a NATS message that should be captured.

For example, the NATS signature is recognized in the following sixth code segment:

```
Aspect.new     :around, :calls_to => /(send|receive)_data/,
               :type_and_descendents =>
                    [/(NATSD|EventMachine)::(.*)/,
                     /(NATS|EventMachine)::(.*)::(.*)/],
               :method_options[:public] do |jpt, obj, *args|
    # analyzing captured NATS message
end
```

NATS message analysis is shown in the seventh code segment as follows:

```
NATS Message Analysis:
    Message Channel
    Message Content - JSON Object
```

Capturing REST messages using a REST HTTP client will now be discussed. The REST message capture, used for HTTP messages communicated within Cloud Foundry DVP system 700 (see FIG. 7), capture HTTP messages based on the following signature of the eighth code segment:
request=>/CFoundry::RESTClient/

An example of the result of capturing an example REST message is shown in the ninth code segment as follows:

```
Aspect.new      :around, :calls_to => / request$/,
                :type_and_descendents => /CFoundry::RestClient/,
                :method_options[:public] do |jpt, obj, *args|
                # analyzing captured REST message
  end
  REST  Message:
        HTTP Method
        HTTP Target URL
        HTTP Request
        HTTP Response Body
```

Figure 9:
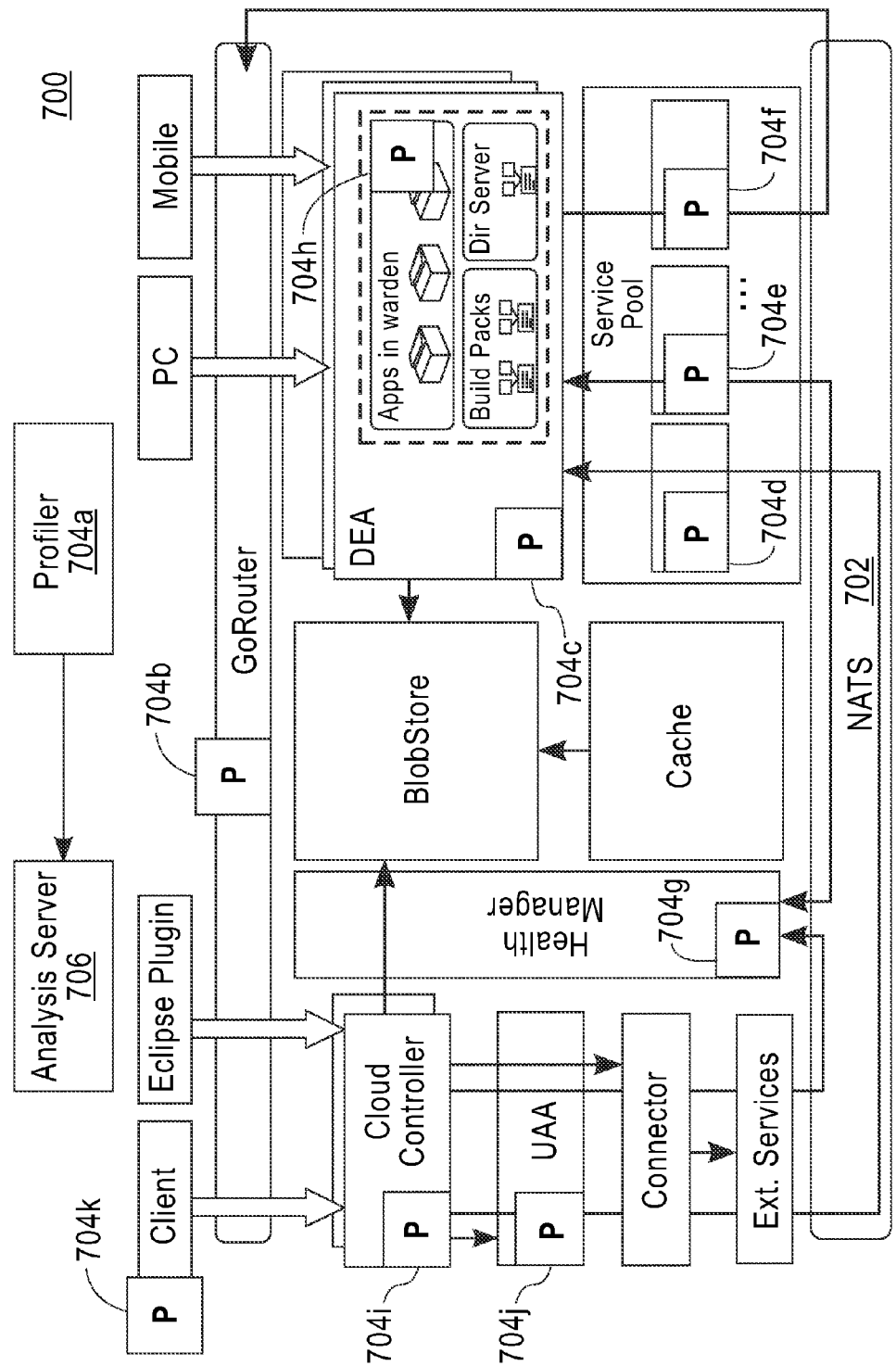
FIG. 9 is another block diagram of the third embodiment of a system according to the present invention.

FIG. 9 shows Cloud Foundry DVP system 700 drawn to show the inclusion of profiler module (see Definitions section) 704 and analysis server 706. More specifically, profiler module 704 includes main sub-module 704a and auxiliary sub-modules 704b to 704k. Even more specifically, the auxiliary profiler sub-modules (sub-mods) are respectively located in the following portions of DVP system 700: (i) sub-mod 704b is in the router block; (ii) sub-mod 704c is in the DEA block; (iii) sub-mods 704d to 704f are in the service blocks of the service pool; (iv) sub-mod 704g is in the health manager block; (v) sub-mod 704h is in the apps-in-warden block; (vi) sub-mod 704i is in the cloud controller block; (vii) sub-mod 704j is in the UAA (User Account and Authentication, it is a service that is a component of Cloud Foundry) block; and (viii) sub-mod 704k is in the client block. Although all of these communication paths are not shown in FIG. 9, all profiler sub-modules communicate to analysis server 706.

Documentation generation according to some embodiments of the present invention will now be discussed with a focus on message exchange patterns. Documentation generation and message exchange patterns are shown in the following tenth code segment (including a content table):

Channel Name: dea.advertise
Content Table:

| Name            | Type       |
|-----------------|------------|
| app_id_to_count | Hash       |
| available_memory| FixNum     |
| Id              | String     |
| Prod            | FalseClass |
| stacks          | Array      |

Subscribers:
  Cloud_Controller
Publishers:
  DEA

Figure 10:
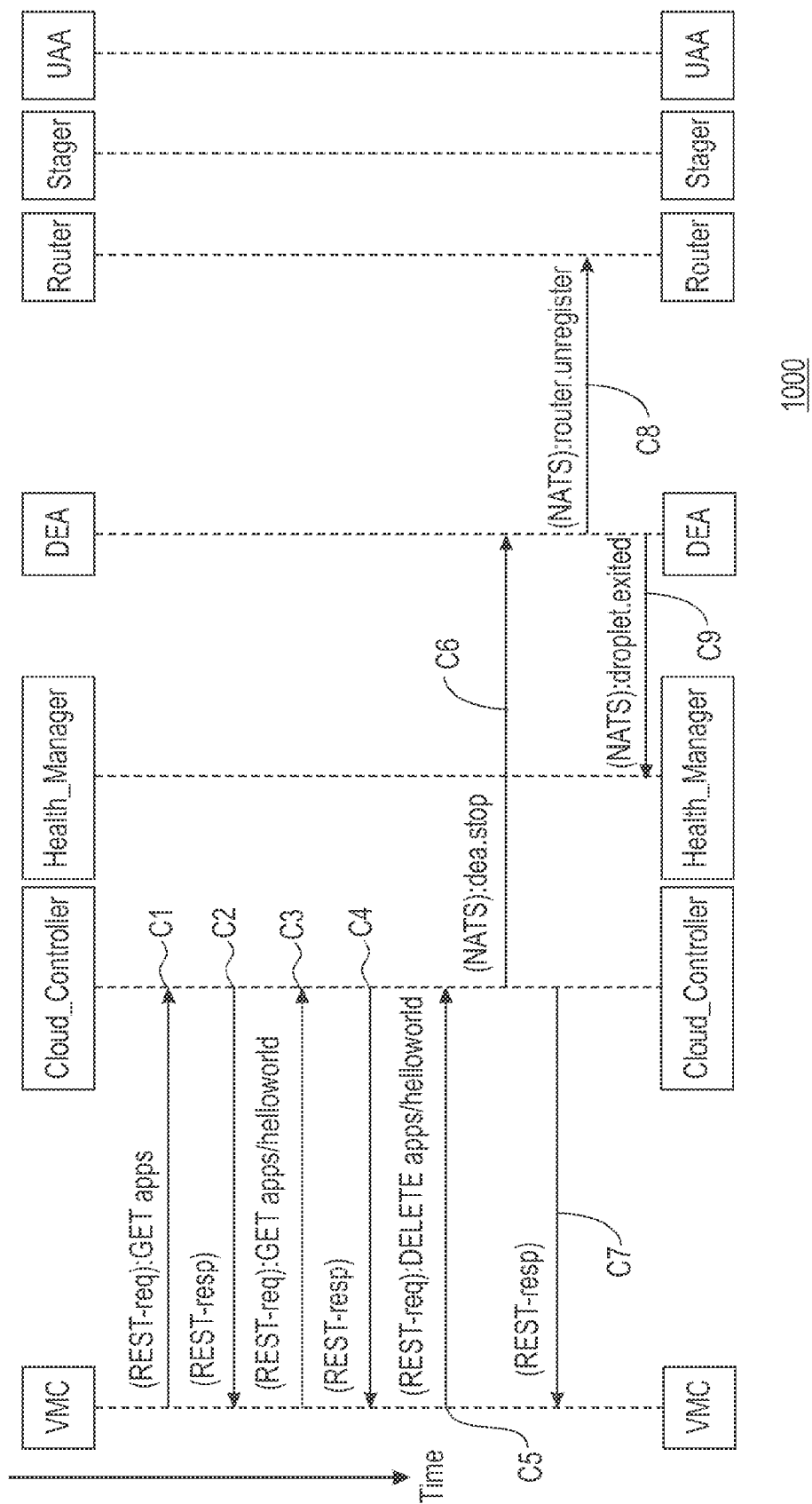
FIG. 10 is an example of abstract of control flow according to the present invention.
Figure 11:
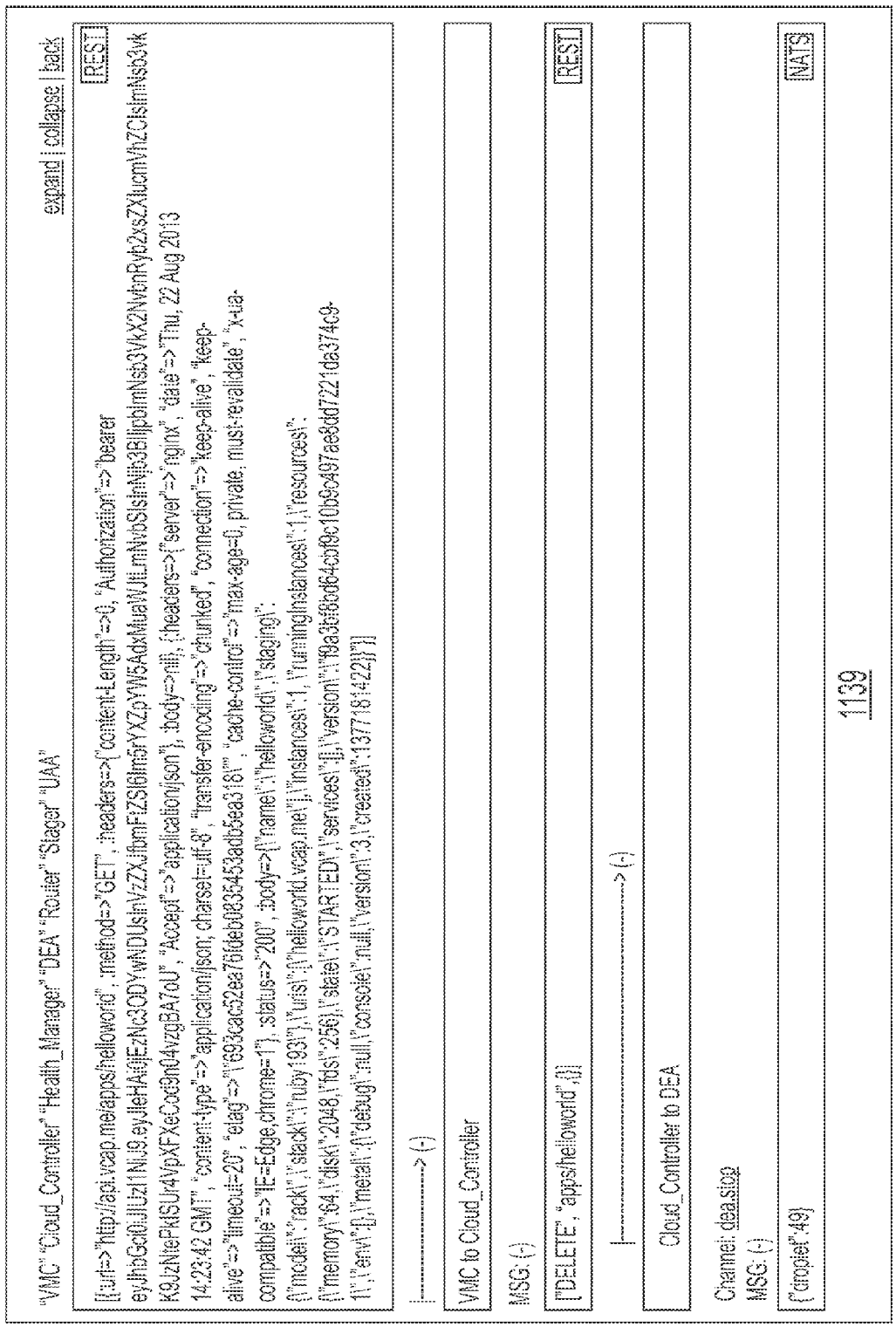
FIG. 11 is a screenshot view showing information that helpful in understanding embodiments of the present invention.

An example of a message exchange sequence that can generate documentation showing an abstracted control of flow is shown in diagram 1000 of FIG. 10. More specifically, diagram shows nine (9) communications C1 to C9 that occur over time during a DVP process. Profiler module 704 (see FIG. 9) captures corresponding message snapshots as shown in screenshot 1139 of FIG. 11. Analysis server 706 then uses these message snapshots, collected as communications C1 to C9 occur, to generate the abstracted control of flow shown in screenshot 1200 of FIG. 12.

An example of system evolution, in the form of message pattern changes is shown in the eleventh code segment (including a revised content table) as follows:

Channel Name: dea.advertise
Content:

| Name            | Type     |            |
|-----------------|----------|------------|
| app_id_to_count | Hash     |            |
| available_memory| FixNum   |            |
| Id              | String   |            |
| Prod            | NilClass | FalseClass |
| runtimes stacks | Array    |            |

Subscribers:
  Cloud_Controller
Publishers:
  DEA

In some embodiments, the "code snippets" take the form of code that participate into the distributed systems under analysis, so therefore they make methods/message calls to other components.

Some embodiments of the present invention may include one, or more, of the following features, characteristics and/or advantages: (i) abstract the flow of control of a system of distributed software components by synthesizing from the execution of code snippets injected into the components, without enabling data flow across algorithm blocks in a control system; (ii) flow of control that is abstracted via the execution of code snippets injected into a system of distributed software components; and/or (iii) the flow of control that is abstracted via the execution of code snippets injected into a system of distributed software components.

In some embodiments, the points at which the snippets are inserted are locations in the distributed components that send and/or receive relevant messages to other distributed components. Examples of these messages in Cloud Foundry are NATS messages and REST sends and receives. The snippets gather information in the messages sent and/or received and relay it to the analysis server. The FIGS. 9 to 12 illustrate in the context of NATS and REST messages in a Cloud Foundry DVP.

For the relevant code segments set forth above, the block delimited by "Aspect.new . . . end" denotes the code snippet as an aspect in Aquarium. The comment (starting with "# analyzing . . . ") indicates that NATS or REST specific code is written for any method that matches the pattern given in the aspect specification, and that is intended to do the message information gathering.

The portions at the bottom of the relevant code segments, set forth above, indicate the NATS or REST specific information that is: (i) gathered by profiler 704; and (ii) that analysis server 706 receives and collects for its analysis.

Figure 13:
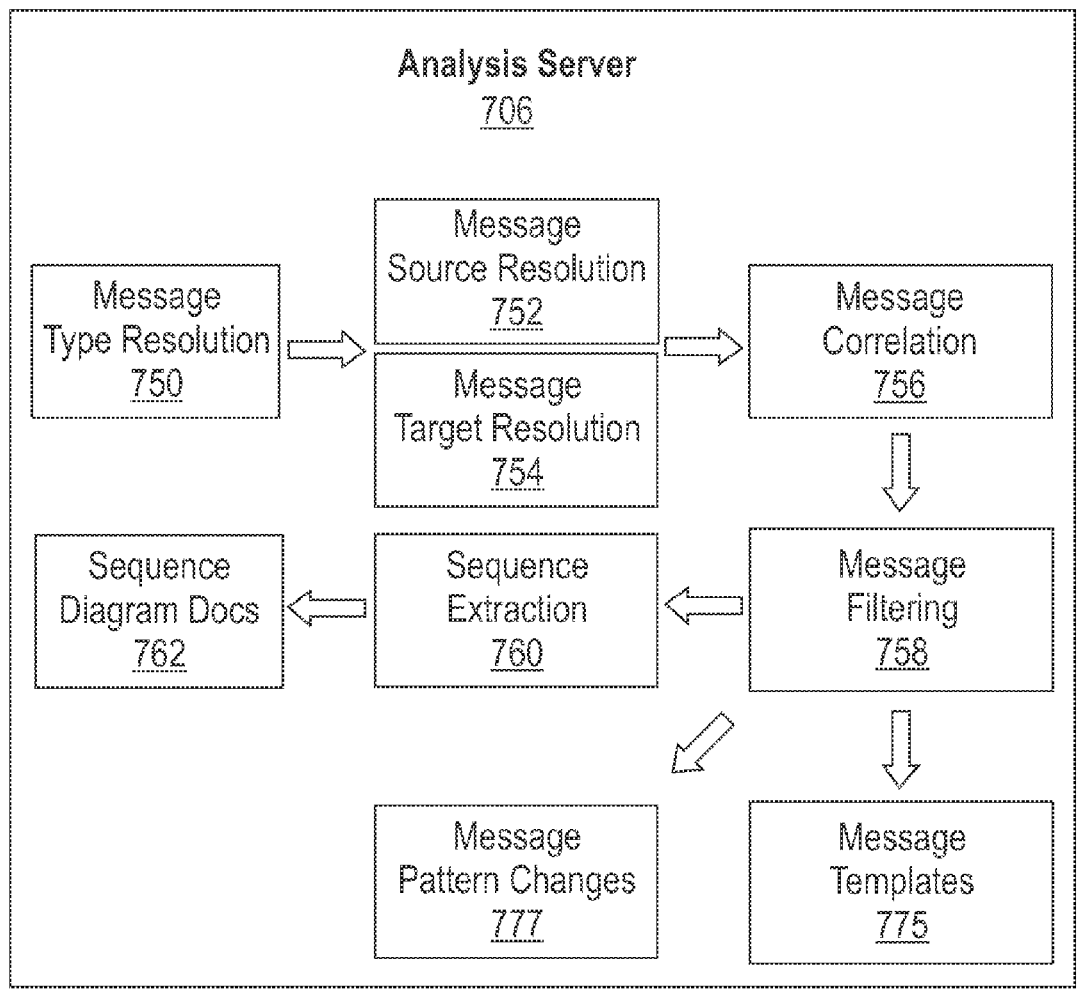
FIG. 13 is another block diagram of a portion of the third embodiment of a system according to the present invention.

FIG. 13 shows a more detailed view of analysis server 706, which includes message type resolution block 750; message source resolution block 752; message target resolution block 754; message correlation block 756; message filtering block 758; sequence extraction block 760; sequence diagram docs block 762; message templates block 775; and message pattern changes block 777. The order in which the various blocks perform their respective operation, in this particular embodiment, is shown by arrows in FIG. 13.

Message type resolution block 750 determines whether the message is REST, NATS, or has some other form and format. This is useful because it helps determine how the gathered message will be interpreted by the other blocks.

Message source resolution block 752 interprets the message to determine the distributed software component that sent the message. Message target resolution 754 interprets the message to determine the distributed software component that received the message.

Message correlation block 756 determines which message is sent from which source to which target component.

NATS messages contain message body and channel names. It is the job of the analysis server to figure out who is publishing to a given channel and who is subscribed to a channel. For a given channel, there could be multiple subscribers or publishers however often it happens that only one of the subscribers is the target of a dispatched message By analyzing the exchange patterns, the analysis server identifies the exact source and the target for a given message.

Message filtering block 758 filters the message in order to filter out certain messages. More specifically, not all messages are intended for all subscribers to a given channel and not all messages deliver an operational value. The job of the filtering block is to identify and remove the messages that do not have any semantic meaning to them. An example of this is heartbeat messages that are dispatched by all components in order to show that the components are functional. These messages do not represent the execution of a workflow in the system and, as a result, they are filtered from the list of captured messages in this particular embodiment.

After message filtering, processing splits into three branches. One branch proceeds to sequence extraction block 760 which extracts a time sequence of various messages sent in the system. The messages may not be received by analysis server 706 in the order in which they were received and/or sent by distributed software components of DVP system 700, so sequence extraction block 760 effectively corrects for that. Processing proceeds to sequence diagram docs block 762 which can generate machine readable and/or human understandable presentation of the message sequence (see diagram 1000 of FIG. 10) and/or an abstract of the process flow (see screenshot 1200 of FIG. 12).

Another processing branch referred to in the previous paragraph proceeds to message templates block 775. The message template block receives messages exchanged between the same source and target over a period of time and extracts the template for the messages exchanged. The tenth code segment (discussed above) involves an example of this, where, based on the analysis of messages exchanged between the CloudController and the DEA, the template for the message exchanged over the channel "dea.advertise" is extracted and column names and column types are identified.

Another processing branch referred to two (2) paragraphs previous proceeds to message pattern changes block 777. The message pattern changes block makes changes to the content table as shown, above in the code segments including the original and revised content tables. The content table compares and presents the evolution of message templates over time. As shown in connection with the eleventh code segment, above, the value of the "prod key" is changed from "NilClass" to "FalseClass" as part of changes made between an earlier version of CloudFoundry and a later version of CloudFoundry. Same is the case with the key name "oruntime," which has been changed to "stacks" as part of a change between software versions.

In some embodiments, the code snippets are simply code that participates into the distributed systems under analysis, so therefore they make methods/message calls to other components. The code snippets are the same as profiler blocks 704b to 704k shown in FIG. 9. Those code snippets attach themselves to each component in the system, instrument the component, inject the monitoring and profiling code, and then let the instrumented component execute.

In some embodiments, machine logic injects code to the distributed system components to "catch" places where the distributed system components makes methods/message calls to other components, and, thereby, collects these messages for analysis.

In some embodiments, the use cases can be any code that exercises the system in a fashion that is typical. So, for instance, replying to an email would be a use case if the system under analysis was an email handling system.

In some embodiments, the analyzer block is generic in the sense that it will work across multiple software packages and/or versions of the system.

In some embodiments, the documentation that the analyzer block provide includes one, or more, of the following: (i) sequence diagrams; (ii) HTML docs with example messages, (iii) details of messages; and/or (iv) differences between old and new versions of messages, etc.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   injecting a plurality of code snippets respectively into a plurality of components of a distributed component software system (DCSS), with each code snippet of the plurality of code snippets being logically located in its respective component to catch places where the components makes a method or message call to call-recipient component, and with the code snippet causing the method or message call to be sent to an analysis server in addition to be sent to the call-recipient component;
   executing a use case on the DCSS, with the execution of the use case including:

executing at least some of the code snippets of the plurality of code snippets so that a plurality of use-case method and/or message calls are send to the analysis server, and receiving, by the analysis server, the plurality of method and/or message calls; and synthesizing, by the analysis server, an abstract of a flow of control of the DCSS based, at least in part, on the plurality of use-case method or message calls.

2. The method of claim 1 further comprising:
presenting the abstract to a human user.

3. The method of claim 1 further comprising:
saving the abstract in machine readable form.

4. The method of claim 1 wherein each use-case method or message call of the plurality of use-case method or message calls is in a respective communication protocol of a plurality of communication protocols, the method further comprising:

for each given use-case method or message call of the plurality of use-case method or message calls, determining, by the analysis server, the communication protocol for the given use-case method or message call.

5. The method of claim 1 further comprising:
generating, by the analysis server, a message template based on the message calls of the plurality of use-case method or message calls.

6. The method of claim 1 further comprising:
augmenting, by a first injected code snippet running on a first component of the DCSS, raw data of a first use-case method or message call of the plurality of use-case method or message calls with abstract information related to preparation of the human-understandable abstract.

7. A computer program product comprising:
a machine readable storage device; and
computer code stored on the machine readable storage device, with the computer code including instructions for causing a processor(s) set to perform operations including the following:

injecting a plurality of code snippets respectively into a plurality of components of a distributed component software system (DCSS), with each code snippet of the plurality of code snippets being logically located in its respective component to catch places where the components makes a method or message call to call-recipient component, and with the code snippet causing the method or message call to be sent to an analysis server in addition to be sent to the call-recipient component, executing a use case on the DCSS, with the execution of the use case including:

executing at least some of the code snippets of the plurality of code snippets so that a plurality of use-case method and/or message calls are send to the analysis server, and receiving, by the analysis server, the plurality of method and/or message calls; and synthesizing, by the analysis server, an abstract of a flow of control of the DCSS based, at least in part, on the plurality of use-case method or message calls.

8. The computer program product of claim 7 wherein the computer code further includes instructions for causing the processor(s) set to perform the following operation:
presenting the abstract to a human user.

9. The computer program product of claim 7 wherein the computer code further includes instructions for causing the processor(s) set to perform the following operation:
saving the abstract in machine readable form.

10. The computer program product of claim 7 wherein each use-case method or message call of the plurality of use-case method or message calls is in a respective communication protocol of a plurality of communication protocols, the method further comprising:

for each given use-case method or message call of the plurality of use-case method or message calls, determining, by the analysis server, the communication protocol for the given use-case method or message call.

11. The computer program product of claim 7 wherein the computer code further includes instructions for causing the processor(s) set to perform the following operation:
generating, by the analysis server, a message template based on the message calls of the plurality of use-case method or message calls.

12. The computer program product of claim 7 wherein the computer code further includes instructions for causing the processor(s) set to perform the following operation:
augmenting, by a first injected code snippet running on a first component of the DCSS, raw data of a first use-case method or message call of the plurality of use-case method or message calls with abstract information related to preparation of the human-understandable abstract.

13. A computer system comprising:
a processor(s) set;
a machine readable storage device; and
computer code stored on the machine readable storage device, with the computer code including instructions for causing the processor(s) set to perform operations including the following:

injecting a plurality of code snippets respectively into a plurality of components of a distributed component software system (DCSS), with each code snippet of the plurality of code snippets being logically located in its respective component to catch places where the components makes a method or message call to call-recipient component, and with the code snippet causing the method or message call to be sent to an analysis server in addition to be sent to the call-recipient component, executing a use case on the DCSS, with the execution of the use case including:

executing at least some of the code snippets of the plurality of code snippets so that a plurality of use-case method and/or message calls are send to the analysis server, and receiving, by the analysis server, the plurality of method and/or message calls; and synthesizing, by the analysis server, an abstract of a flow of control of the DCSS based, at least in part, on the plurality of use-case method or message calls.

14. The computer system of claim 13 wherein the computer code further includes instructions for causing the processor(s) set to perform the following operation:
presenting the abstract to a human user.

15. The computer system of claim 13 wherein the computer code further includes instructions for causing the processor(s) set to perform the following operation:
saving the abstract in machine readable form.

16. The computer system of claim 13 wherein each use-case method or message call of the plurality of use-case method or message calls is in a respective communication protocol of a plurality of communication protocols, the method further comprising:
 for each given use-case method or message call of the plurality of use-case method or message calls, determining, by the analysis server, the communication protocol for the given use-case method or message call.

17. The computer system of claim 13 wherein the computer code further includes instructions for causing the processor(s) set to perform the following operation:
 generating, by the analysis server, a message template based on the message calls of the plurality of use-case method or message calls.

18. The computer system of claim 13 wherein the computer code further includes instructions for causing the processor(s) set to perform the following operation:
 augmenting, by a first injected code snippet running on a first component of the DCSS, raw data of a first use-case method or message call of the plurality of use-case method or message calls with abstract information related to preparation of the human-understandable abstract.

* * * * *